United States Patent [19]

Roman

[11] 4,396,292
[45] Aug. 2, 1983

[54] WINDROWING-TYPE COMPOSTING APPARATUS

[75] Inventor: Walter C. Roman, Worthington, Ohio

[73] Assignee: Bancohio National Bank, Columbus, Ohio

[21] Appl. No.: 255,752

[22] Filed: Apr. 20, 1981

Related U.S. Application Data

[63] Continuation-in-part of Ser. No. 114,634, Jan. 23, 1980, Pat. No. 4,290,703.

[51] Int. Cl.³ .............................................. B02C 21/02
[52] U.S. Cl. .................................. 366/345; 241/101.7
[58] Field of Search ..................... 366/345; 241/101.7; 180/6.48, 6.30

[56] References Cited

U.S. PATENT DOCUMENTS

| | | |
|---|---|---|
| 3,369,797 | 2/1968 | Cobey . |
| 3,478,831 | 11/1969 | Auchard ............................ 180/6.48 |
| 3,606,265 | 9/1971 | Cobey . |
| 3,647,011 | 3/1972 | Baumgartner ..................... 180/6.48 |
| 3,664,645 | 5/1972 | Cobey . |
| 3,712,403 | 1/1973 | Pakosh .............................. 180/6.48 |
| 3,733,033 | 5/1973 | Cobey . |
| 3,858,814 | 1/1975 | Wagner, Jr. ..................... 366/345 X |

Primary Examiner—Philip R. Coe
Assistant Examiner—Frankie L. Stinson
Attorney, Agent, or Firm—Mueller and Smith

[57] ABSTRACT

Windrowing apparatus utilizing a windrowing conveyor which confronts an elongate row of biodegradable material for agitating and transferring it. The apparatus has two rearwardly disposed drive wheels which are fixed to a rigid frame and are selectively driven by hydraulic motors. The wheels have fixed axes to carry out pivotal turns. A third wheel forwardly disposed in a location remote from the row of material being windrowed provides the third component of a three point support. An internal combustion engine is mounted on the rigid frame to provide a primary source of power to hydraulic motors driving the rear wheels and the conveyor itself.

13 Claims, 8 Drawing Figures

WINDROWING-TYPE COMPOSTING APPARATUS

RELATED APPLICATIONS

This application is a continuation-in-part of co-pending application Ser. No. 06/114,634, entitled "Windrowing-Type Composting Apparatus" filed Jan. 23, 1980, assigned in common herewith now U.S. Pat. No. 4,290,703.

BACKGROUND OF THE INVENTION

The treatment of waste, whether generated through municipal collection systems or through a broad range of industries, may be observed to vary from simple land-fill techniques to somewhat sophisticated chemical and biochemical conversion methods. With the latter methods, significant capital commitments generally are called for which require justification by virtue of environmental protection requirements and/or the generation of profitable by-products.

Controlled composting procedures are considered to offer significant promise for providing for an improved disposal of biodegradable industrial and municipal wastes while generating a somewhat valuable by-product. The preferred approach to treatment of wastes by biodegradation is one wherein composting is carried out in the thermophilic phase at temperatures of about 45°–50° C. At such temperatures, bacteria otherwise active in a mesophilic phase at lower temperatures are avoided and noxious odors are not present in the process.

To achieve thermophilic phase digestion, adequate aeration and agitation of the material is required. Generally, the approach to carrying out the thermophilic digestion requiring the lowest capital investment is that of windrowing the waste material. With this approach, long rows of waste are developed which are laterally transferred and, consequently, aerated and agitated by a windrowing device. Thus, the waste material is progressively transferred from one row position to a next, for example, from right to left, across a treatment region over a period of time until a last row position is reached at which point the digestive process is completed and a valuable by-product is available for commercial sale. Such by-products find use, for example, as a surface treatment for strip mine soil reclamation or soil rejuvenation.

The type of windrowing machine currently utilized in industry is one resembling a flight conveyor having a series of parallel, elongate paddles which are mutually interconnected by continuous chains and driven by a hydraulic motor. In operation, a rather large front-end loader is utilized to suspend the conveyor at an angle both with respect to the ground and the axis of the windrow pile while moving forward at a relatively low speed, for instance 1 MPH, such that the lower disposed region or side of the conveyor confronts the row of material and, in effect, thrusts it into an adjacent row. Generally, these rows, which have a width of about 10–12 feet, will be transversely moved such that adjacent rows become spaced about 15 feet apart from center-to-center. The type of front-end loader employed for this procedure necessarily is rather large, typically, a 202 HP loader weighing about 26 tons being utilized.

In the above-described U.S. Pat. No. 4,290,703, apparatus is provided wherein a flight-type windrow conveyor is supported forwardly upon a rigid frame which, in turn, is supported by three freely rotatable wheels. By so positioning these wheels about the frame, the windrow conveyor is properly positioned to confront a row of waste material being transferred, and these supporting wheels of the frame of the apparatus do not encounter the waste. This device is configured for connection with a front-end loader device and may utilize a self-contained motor for providing hydraulic power to the windrow conveyor components. Advantageously, lower powered front-end loaders or the like may be utilized with the improved apparatus. However, during the operation of the apparatus, operators have noticed a "fishtailing" effect which must be accommodated for during performance. Because a windrowing facility may potentially involve the presence of various toxins due, for example, to the loss of aerobic treatment, the physical ground structure uopn which waste treatment takes place is somewhat elaborate. For example, water within the region is fully controlled, underground air ducting is provided as well as water treatment tanks. Thus, minimization of the required area for such for such treatment regions represents an important cost savings. Further, because a continuous waste agitation by windrowing machines is required, a redundancy of machines is needed for each facility to accommodate for any machine breakdown.

SUMMARY

The present invention is addressed to windrowing apparatus which is self-propelled and requires a lower power input than heretofore required for such equipment. Through the use of two fixed drive wheels which are selectively activated, precise, substantially pivotal turning and highly stable forward motion operational attributes during windrowing procedures are achieved. The turning characteristic thus provided permits more efficient use of the region within which windrowing of biodegradable material takes place. In the event the power components of the windrowing apparatus break down, simple adjustments readily may be carried out to couple it to a conventional front end loader for continued operation in the manner described in U.S. Pat. No. 4,290,703 (supra).

Another feature and object of the invention is to provide windrowing apparatus for laterally transferring an elongate row of biodegradable material, that row being oriented along a given centrally disposed axis and having a predetermined width. The apparatus includes a conventional windrow flight-type conveyor having spaced, parallel and mutually interconnected elongate paddles or flights which are drivably movable and have a downwardly disposed region which is intended for confrontation with the waste material within each row. A hydraulic motor arrangement drives these paddles and a rigid frame is provided upon which the windrow conveyor is mounted and which further supports a first or primary motor for providing all power to the apparatus. Two drive wheels are connected with the frame and positioned generally rearwardly of the conveyor for supporting and driving the rigid frame, and these wheels have fixed axes of rotation aligned to normally drive the apparatus along a vector parallel with the centrally disposed axis to urge the flight conveyor into confrontation with the biodegradable material. Hydraulic motors or the like are selectively powered from the primary motor and are coupled in driving relationship with the two rearwardly disposed wheels. A third wheel is positioned upon the rigid frame spaced from the rear drive wheels which is freely rotatable and pivotal to permit facile turning. By selectively activating the drive wheels, substantially pivotal turning procedures may be carried out.

Other objects of the invention will, in part, be obvious, and will, in part, appear hereinafter.

The invention, accordingly, comprises the apparatus possessing the construction, combination of elements and arrangement of parts which are exemplified in the follow detailed discosure.

For a fuller understanding of the nature and objects of the invention, reference should be had to the following description taken in connection with the accompanying drawings.

DETAILED DESCRIPTION

Figure 1:
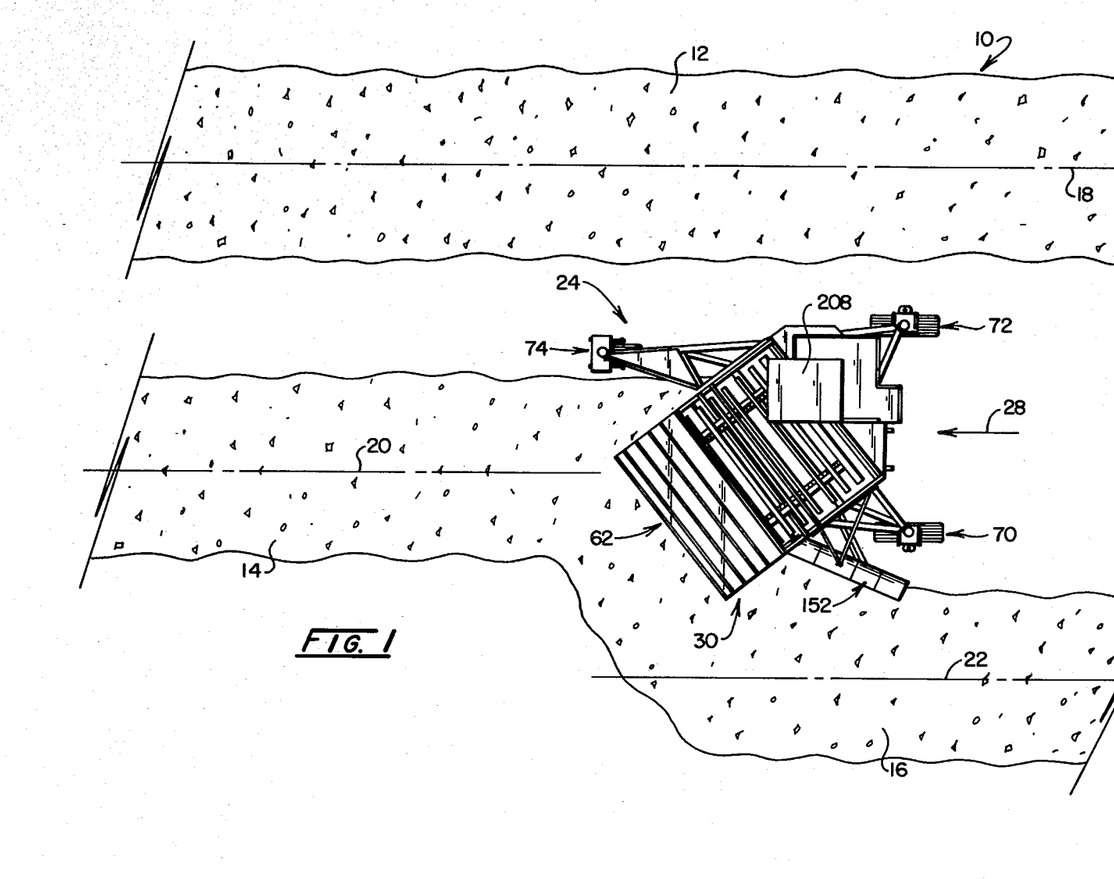
FIG. 1 is a top fragmentary view of windrowing apparatus according to the invention illustrated in conjunction with two adjacent windrows of biodegradable waste material.

Referring to FIG. 1, an overhead view of a portion of a treatment region is represented generally at 10. Such treatment regions 10 preferably are provided having a paved and enclosed surface sufficient both to support the machinery and the like utilized upon it as well as to permit adequate turning radii and the like. Additionally, as disclosed in U.S. Pat. No. 4,290,703, assigned in common herewith, various other features are provided in the region to control waste water runoff and moisture as well as to provide for the appropriate ingress and egress of the biodegradable material of the treatment system. Such biodegradable waste is represented within region 10 in schematic fashion as rows thereof at 12, 14 and 16. Each of the rows 12, 14 and 16 are shown as being oriented along a centrally disposed axis, for example, windrow 12 is symmetrically oriented about axis 18, windrow 14 is symmetrically oriented about axis 20, and windrow 16 is symmetrically oriented about axis 22. As indicated above, these rows will have a width of about 10–12 feet and adjacent rows will be spaced apart about 15 feet from center-to-center.

Windrowing apparatus according to the invention is represented generally at 24 in operational confrontation with the biodegradable material within row 14. Apparatus 24 is self-propelled and its movement into windrow 14 causes an agitation of the material therein and a generally lateral "thrusting" of it to establish the adjacent and thus agitated windrow material as at 16. This movement of apparatus 24 generally is along a vector represented by arrow 28 and takes place at a speed of about 1 MPH. Referring additionally to FIGS. 2–5, apparatus 24 is shown to support a windrow conveyor represented generally at 30 which is comprised of a plurality of spaced, parallel and elongate paddles or flights, certain of which are identified at 32. These paddles 32 are mutually interconnected by parallel, endless chains 34 and 36. Chains 34 and 36 extend about sprockets, the lowermost disposed of these sprockets being revealed in FIG. 2 at 38 and 40, chain 34 extending about sprocket 38 and chain 36 extending about sprocket 40. Sprockets 38 and 40 are mounted for free rotation upon an axle hidden from view in FIG. 2 but supported by sideplate and beam assemblies 42 and 44 as shown, respectively, in FIGS. 3 and 5.

Figure 3:
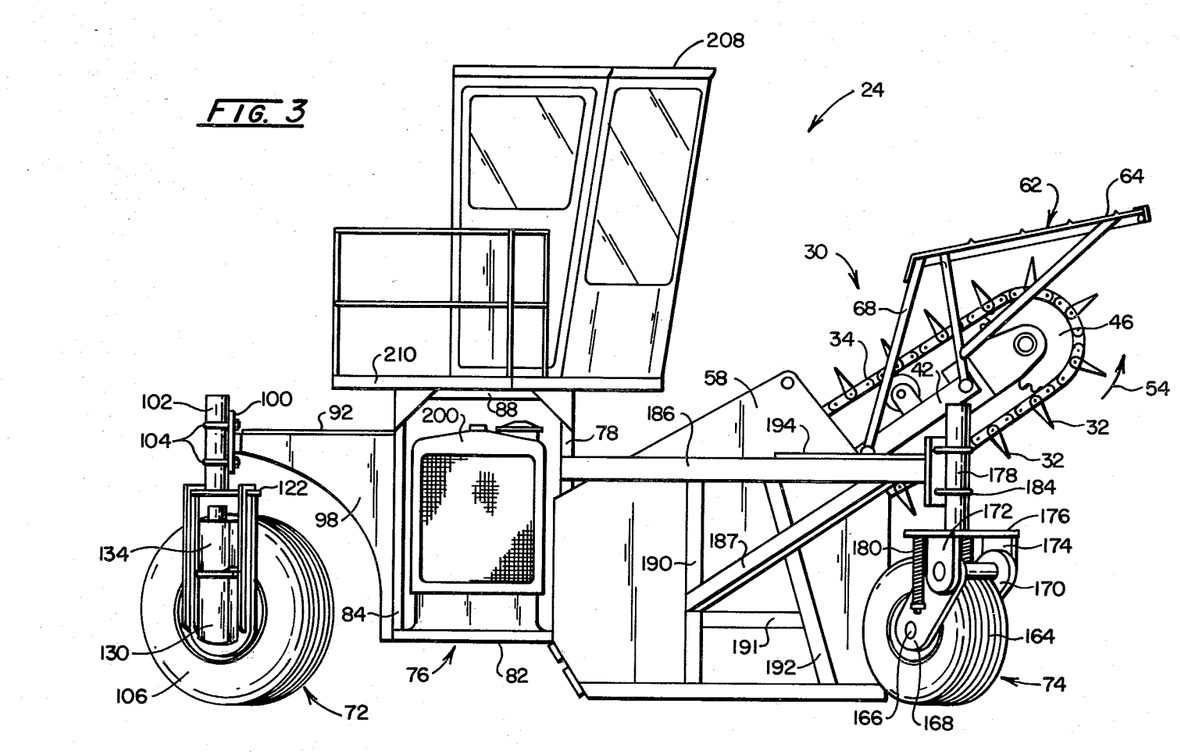
FIG. 3 is an elevational view of the apparatus of FIG. 2 taken in a direction parallel to the elongate paddles of the windrowing components.
Figure 4:
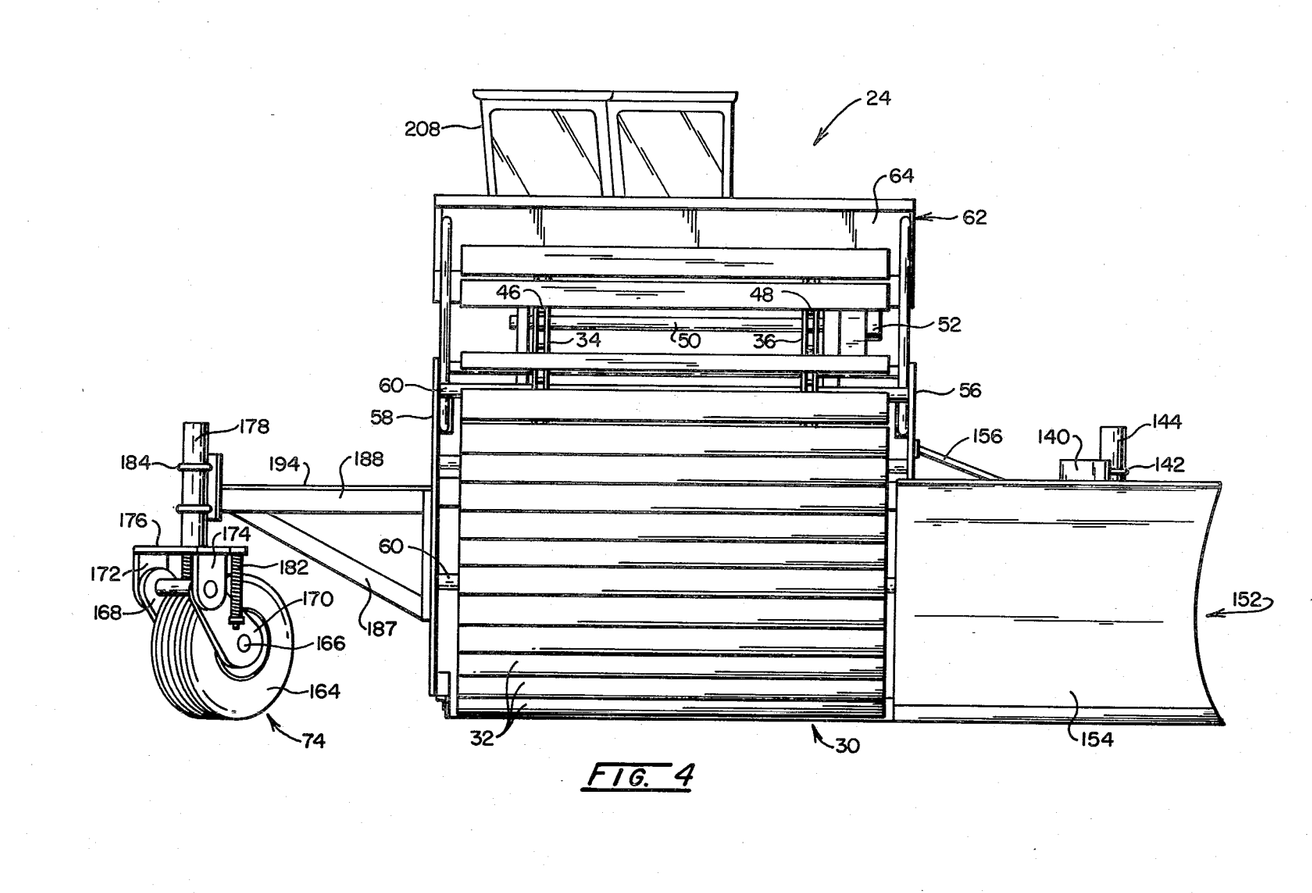
FIG. 4 is an elevational view of the apparatus of FIG. 2 taken in a direction perpendicular to the aforesaid elongate paddles of the apparatus.
Figure 5:
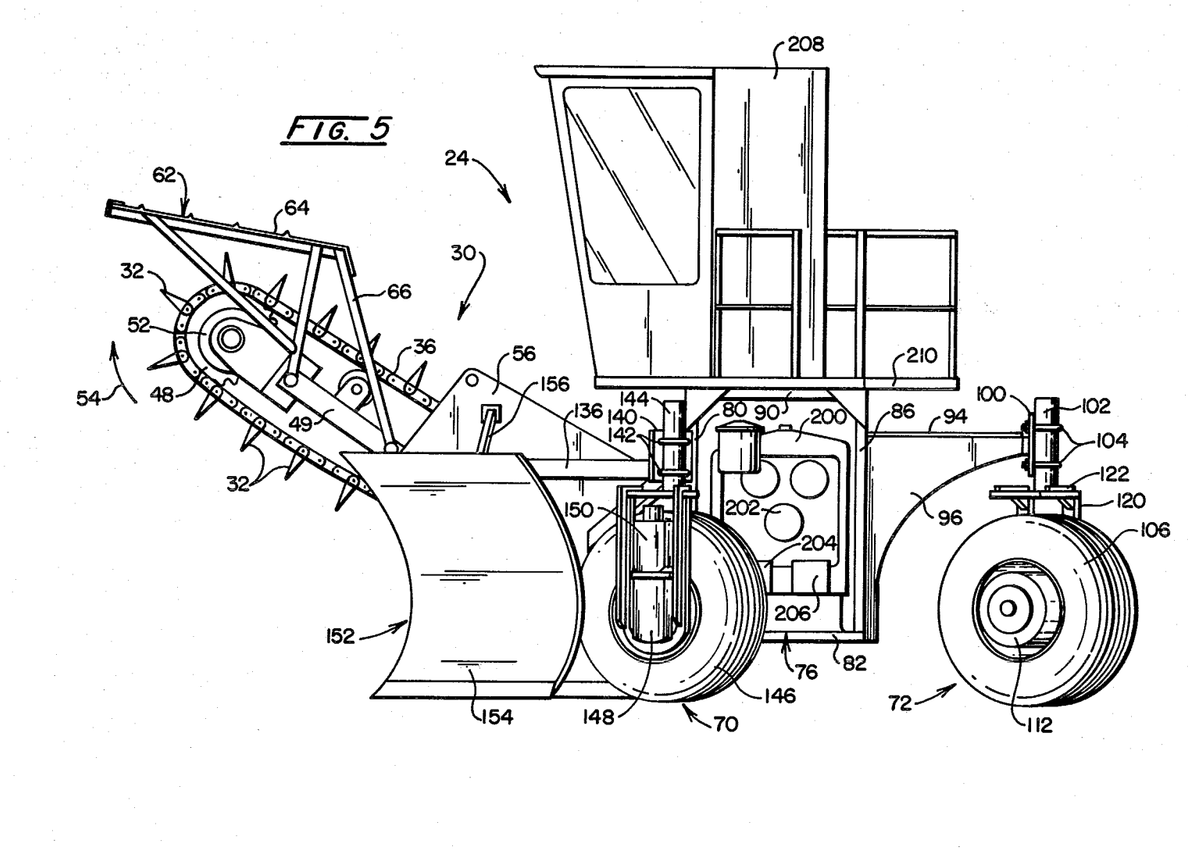
FIG. 5 is an elevational view taken from a position opposite that of FIG. 3.

Referring to FIGS. 3, 4 and 5, upwardly disposed sprockets are shown at 46 and 48 which provide drive to respective chains 34 and 36 in consequence of their fixed coupling with an axle 50 which extends, in turn, from a hydraulic motor 52. Motor 52 drives the windrow conveyor 30 such that the elongate flights or paddles 32 move in the direction represented by arrow 54 shown in FIGS. 3 and 5. Axle 50 is journaled for rotation within sideplate and beam assemblies 42 and 44, assembly 44 also supporting hydraulic motor 52. Principal support for conveyor 30 is provided by plates 56 and 58 which are structurally secured by a series of crossmembers extending over the top of the assembly, certain of which are identified at 60 in FIGS. 2 and 4.

Fixed to and extending from plates 56 and 58 is a shield assembly 62 including a sheet metal top portion 64 and supporting brace assemblies shown generally at 66 and 68 (FIGS. 3 and 5). The downwardly disposed region of windrow conveyor 30 is that portion of it which confronts and causes the transference of a windrow and this portion is revealed most clearly in FIG. 4.

Heretofore, the windrow conveyor 30 as thus described has been coupled to be maneuvered while held in the general orientation shown by a dedicated front-end loader. As such, the device was retained forwardly of all the wheels of the loader and was urged into a windrow of waste material while being driven by hydraulic motor 52, in turn, driven from the hydraulic system of the loader. The direction of movement of the combination has been described in connection with arrow 28 in FIG. 1. Shield assembly 62 serves the function of preventing a rearward carry-over of the waste material being agitated by the assembly. Further description of windrow conveyors as at 30 is provided in U.S. Pat. No. 3,664,645, which is incorporated herein by reference. Because of the necessity for supporting conveyor 30 well forward of the prime mover, relatively heavy and costly front-end loaders have been required for such support, such loaders having customized support structures permanently affixed thereto. In U.S. Pat. No. 4,290,703 described above, the necessity for large prime movers has been minimized through the use of a rigid frame and support structure riding upon freely rotating wheels. Such structure is pushed by a smaller front-end loader, the amount of power as thus described not being required. However, where such coupling with a front-end loader is required, a fishtailing form of reaction has been encountered which requires careful operator control. More importantly, the amount of turning radius required for the combination is such that greater amounts of carefully structured curing regions are required for turn execution at the end of each windrow. Because of the elaborate environmentally concerned precautions necessitated to control water and the like, enlarging such regions is a costly process. Further, it has been determined that even smaller front-end loaders may be utilized within the regions for purposes of loading and the like in the event that they are not required for pushing a windrowing assembly. In accordance with the instant improvement, considerable efficiency is obtained through the use of a self-powered arrangement both for conveyor 30 and for driving the entire assembly 24. Further, the earlier encountered fishtailing drive effect is avoided or minimized and essentially pivotal turns are achieved to minimize the amount of paved and controlled curing region required for the entire system.

Figure 2:
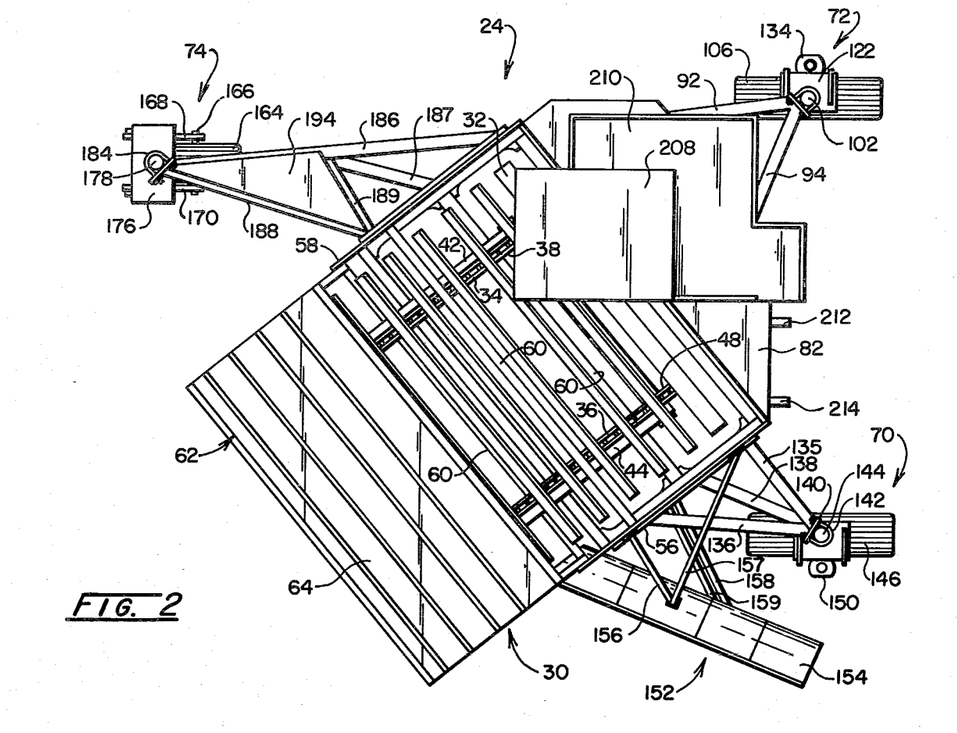
FIG. 2 is a top view of the windrow apparatus of the invention.

FIGS. 1 and 2 reveal that the apparatus 24 of the invention is formed having a rigid frame which supports windrow conveyor 30 in proper orientation, and this frame, in turn, is supported by three wheel assemblies including two drive wheel assemblies shown generally at 70 and 72 and a freely rotatable and pivotable wheel assembly 74. The frame assembly includes a rearwardly disposed open box structure shown generally at 76 which is rigidly attached between plates 56 and 58. Box structure 76 includes forwardly disposed angle components 78 (FIG. 3) and 80 (FIG. 5) extending upwardly and attached to respective plates 58 and 56. A lower platform 82 is shown extending from connections with plates 56 and 58 to upstanding rearward angle components 84 (FIG. 3) and 86 (FIG. 5). An uppermost angle component 88 is shown extending between angles 78 and 84, while a corresponding upper angle 90 is shown extending between angle components 80 and 86.

FIGS. 2, 3 and 5 show the support structure for drive wheel assembly 72 as being comprised of angle components as at 92 and 94 (FIG. 2) which are arranged in a V-shaped configuration and connected to structure 76. Components 92 and 94 further are buttressed by two somewhat identical and rearwardly extending flanges, one of which is shown at 96 in FIG. 5, the other of which is shown at 98 in FIG. 3. Components 92 and 94 as thus buttressed, are welded to a supporting plate 100 to which is rigidly but adjustably secured an upstanding stem 102 of wheel assembly 72. This attachment of stem 102 to plate 100 is provided by U-bolts 104, the adjustment of these bolts serving to align the pneumatic tire 106 of assembly 72.

Figure 6:
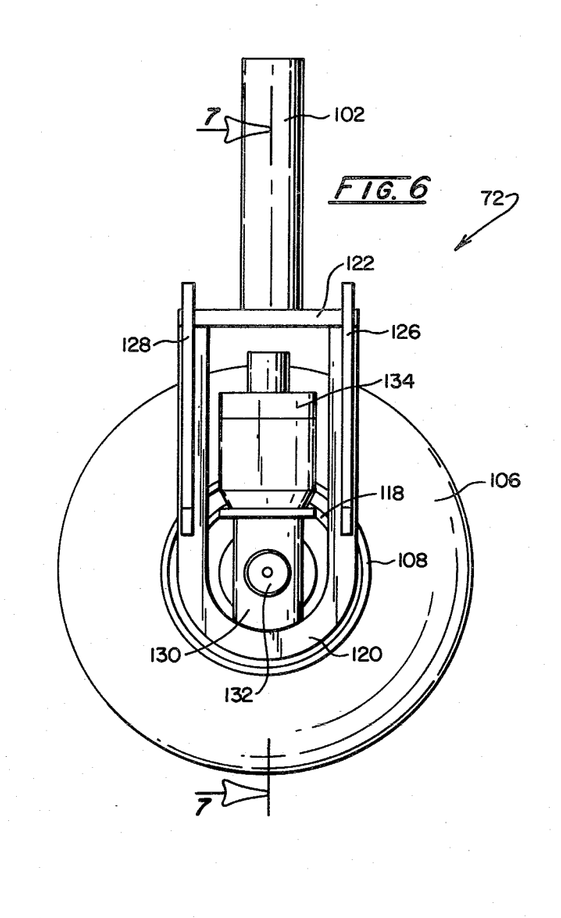
FIG. 6 is a partial elevational view of a powered wheel of the apparatus of FIG. 2.
Figure 7:
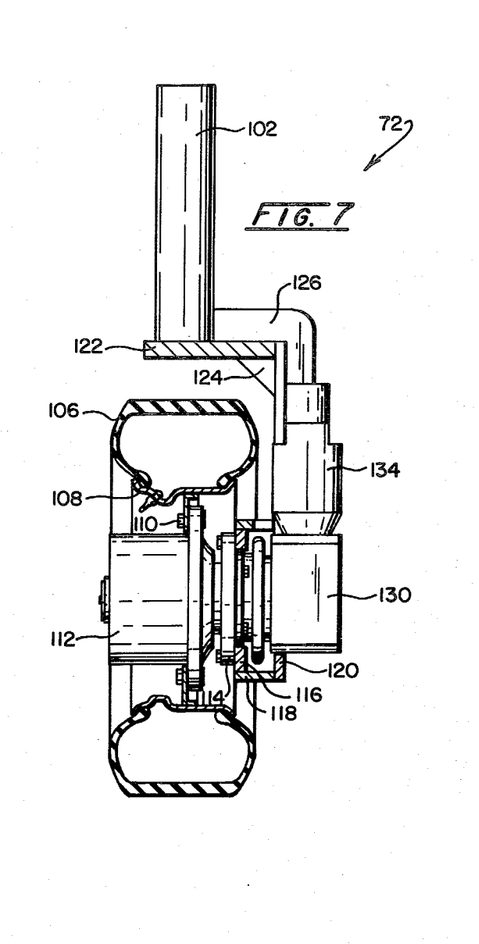
FIG. 7 is a partial sectional view taken through the plane 7—7 in FIG. 6.

Looking additionally to FIGS. 6 and 7, the structure of wheel assembly 72 is revealed in more detail. It may be observed that pneumatic tire 106 is positioned upon a conventional rim 108 which, in turn, is bolted to a flange 110 extending outwardly from a gear reducer 112. Gear reducer 112 is of conventional structure, utilizing planetary gears and may, for example, be provided as a Fairfield torque hub, Model W3C, marketed by Fairfield, Inc., Marion, Ohio. FIG. 7 reveals that the housing of gear reducer 112 includes an attachment collar 114, which, in turn, is bolted to a ring 116 forming part of a yoke utilized for supporting wheel 106. In this regard, ring 116 is weldably attached to a rigid cylinder 118 which, in turn, is welded to a U-shaped yoke or brace 120. Brace 120 is welded to a top plate 122 and further supported by gussets as at 124. Yoke 120 further is buttressed along each of its legs by braces as at 126 and 128 (FIG. 6). Note that stem 102 is welded to top plate 122. Gear reducer 112 is driven from a right angle drive assembly 130 operating in conjunction with a principal axle 132. Drive assembly 130 may, for example, be present as a right angle drive type RA701 produced by Fairfield, Inc. (supra), and in turn, is driven from a hydraulic motor 134 which is powered from hydraulic input and return lines (not shown) described later herein in conjunction with FIG. 8 and associated with a pump arrangement.

Turning to FIGS. 2 and 5, wheel assembly 70 is shown supported from the rigid frame of assembly 24 principally by three channel components 135, 136 and 138. These components are welded to corresponding channel shaped braces (not shown) attached to sideplate 56. The channel members are coupled with a connector plate 140 through which U-bolts 142 extend to rigidly but adjustably retain the upstanding stem 144 of wheel assembly 70. Wheel assembly 70 is structured identically with wheel assembly 72, including a pneumatic tire 146, a gear reduction box (not shown) as described earlier at 112, a right-angle drive assembly 148 identical to that described at 130 and a hydraulic motor 150 identical to that described earlier at 134. Preferably, the axles of tires 146 and 106 are aligned along a common axis.

FIG. 1 reveals that wheel assembly 70 is positioned such that it confronts a portion of the row of waste being windrowed. To provide improved row definition as well as to protect wheel assembly 70 from this waste, a plow assembly represented generally at 152 is provided. Looking additionally to FIGS. 2, 4 and 5, assembly 152 is shown to include a blade 154 which is supported in position by struts 156-159. The edge of plow assembly blade 154 adjacent conveyor 30 is formed having a contour design such that its entire edge is spaced from the moving edges of paddles 32 a distance of about 1 inch. This spacing not only serves to improve the protection of wheel assembly 70 but also serves a "cleaning" purpose with respect to paddles 32.

Referring to FIGS. 2, 3 and 4, the third support for apparatus 24 is shown to be provided by wheel assembly 74. Assembly 74 includes a tire and hub assembly 164 which is freely rotatable about an axle 166 suspended between parallel coupling members 168 and 170. Coupling members 168 and 170 are, respectively, pivotally connected to spaced supports 172 and 174 which, in turn, depend downwardly from a platform 176. Fixed to and extending upwardly from platform 176 is an axle (not shown) which is journaled for rotation within a cylindrical bearing 178. Coupling members 168 and 170 are, respectively, connected to platform 176 through springs 180 and 182 to provide conventional spring suspension for the tire and hub assembly 164 which is pivotable about bearing 178. Bearing 178 is connected through a bracket assembly 184 incorporating a U-bolt connection arrangement to an "outrigger" type frame portion including elongate support components 186-189. As shown in FIG. 3, these support components extend from various portions of the rigid frame of the assembly 24 including angle component 78 and reinforcing members as at 190-192 which are fixed, in turn, to sideplate 58. A reinforcing plate 194 is weldably connected to support components 186 and 188 to provide rigidity. It may be observed in FIG. 2 that the support components 186-189 position wheel assembly 74 at a forward location such that, considering the direction of movement of assembly 24, tire and hub assembly 164 is positioned at a location somewhat corresponding with the forwardmost extending portion of conveyor 30. This arrangement provides a desired balance for the entire assembly 24.

The prime power supply for apparatus 24 is provided as an internal combustion engine revealed in FIGS. 3 and 5 at 200. Engines as at 200 may be provided having, for example, a power valuation of about 180 HP and are typically available in turbo-charged versions from Detroit Diesel Company, Inc., Detroit, Mich. As represented schematically in FIG. 5, engine 200 serves to drive a hydraulic pump 202, the output of which is utilized to power hydraulic motor 52 of conveyor 30. Similarly, hydraulic pumps 204 and 206 are driven from engine 200 to power the hydraulic motors 134 and 150 of respective drive wheel assemblies 72 and 70. As is described later herein, the form of control from the pumps to the motors is one wherein constant pressure is evolved and flow rates are adjusted. This control is provided manually by the operator of apparatus 24 who is situated within a cab 208 positioned upon a platform 210, in turn, positioned upon open box structure 76. Preferably, a "joy stick" guiding device is utilized. With the arrangement thus described, drive is supplied from rearwardly disposed wheel assemblies 70 and 72, which assemblies are rigidly aligned to normally effect movement along the vector of movement 28. Turning operation is provided by varying the drive force applied to one or the other of wheel assemblies 70 or 72. Wheel assembly 74 merely pivots in accordance with such control input. Thus, the apparatus 24 is capable of pivotal turning maneuvers enabling a more efficient use of the region within which the windrowing process takes place. Further, because of the rigid connection of assemblies 70 and 72, the side thrust otherwise developed which occasions fishtailing phenomena and the like is accommodated for, and the apparatus is simpler to maneuver.

Looking to FIGS. 1 and 2, apparatus 24 is shown to include two outwardly extending pivot mounts 212 and 214 which are attached to the rearward frame structure of apparatus 24. These mounts may be coupled by pin connection with the conventional, unmodified arms of a front end loader to provide stand-by propulsion and operation of the apparatus in the event of a failure of prime power supply 200, or associated hydraulic pumps 204 or 206 or motors as described at 134 and 150. Further in this regard, the hydraulic system of such front end loader may be used for powering conveyor motor 52. Preferably, mounts 212 and 214 are connected to the frame of apparatus 24 by a quick disconnect arrangement or bolts extending through slots formed therein. Accordingly, lateral adjustment of the mounts is availed to assure compatibility with various types of prime mover devices.

An advantageous aspect of the utilization of U-bolt 104 mounting plate 100 connection as well as the corresponding connections at wheel assemblies 70 and 74 resides in a capability for somewhat simply adjusting the angle of attack of the windrow conveyor. Where heavy materials, for example within row 20 are encountered, it may be advantageous to lower this angle of attack such that the height of the next adjacent windrow, correspondingly becomes lower. It has been determined that such adjustment lowers the power requirements for the apparatus 24.

Figure 8:
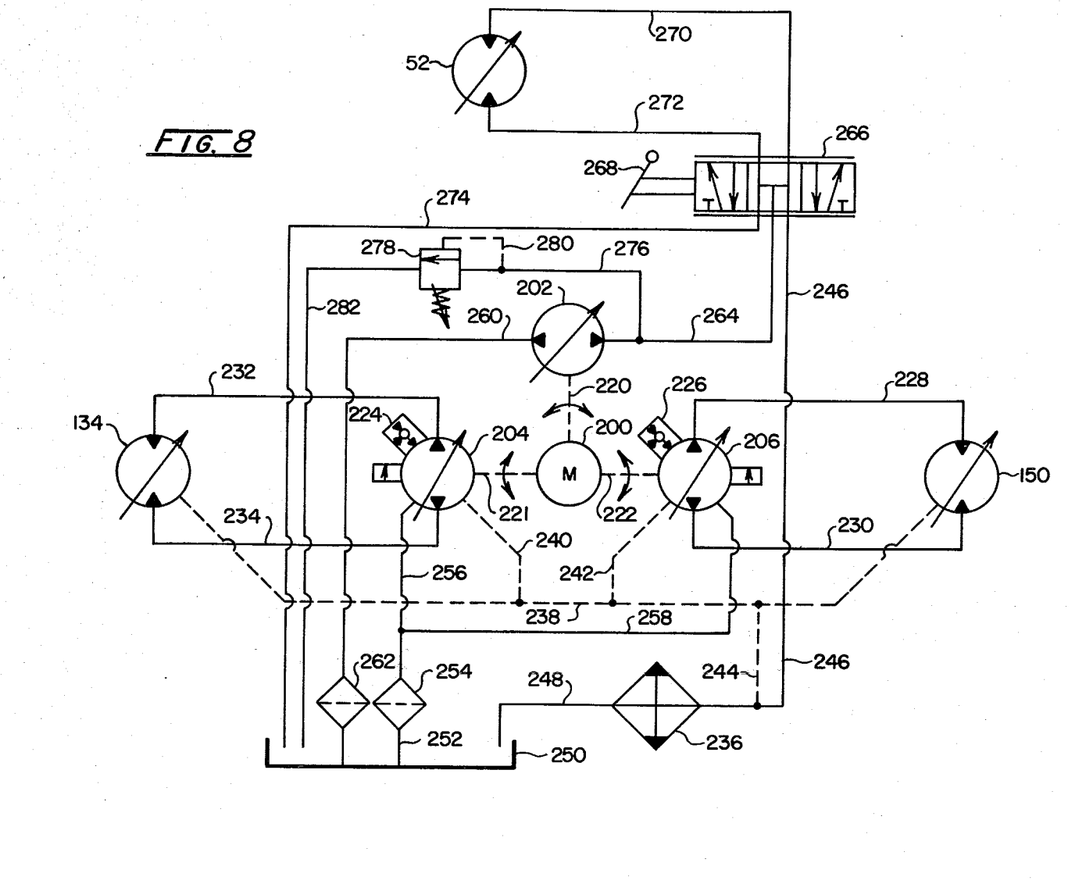
FIG. 8 is a schematic view of a hydraulic drive system utilized with the apparatus of FIG. 2.

Referring to FIG. 8, a schematic portrayal of a hydraulic system which may be utilized in conjunction with controlling wheel assemblies 70 and 72 as well as hydraulic motor 52 driving elevator 30 is revealed. In the figure, internal combustion engine 200 is represented schematically by a circle, while pumps 202, 204 and 206 are schematically represented as variable displacement pressure compensated bi-directional servo-controlled pumps. The mechanical couplings between engine 200 and pumps 202, 204 and 206 are represented, respectively, by dashed lines 220–222. Pumps 204 and 206 are servo controlled as represented, respectively, by blocks 224 and 226 by electrical signals derived, for example by the earlier noted operation of a joy stick within cab 208. The outputs of pump 206 are coupled via hydraulic lines 228 and 230 to hydraulic motor 150 as symbolically represented. Similarly, pump 204 is connected via hydraulic lines 232 and 234 to hydraulic motor 134 which is similarly represented in symbolic fashion. Motors 134 and 150 may be present as variable displacement bidirectional motors, for example, available as a type Series 20, model 20-3023, marketed by Sundstrand Corp. of Belvidere, Ill., while pumps 204 and 206 are marketed by the same organization as model 20-2016. The case drains of pumps 204 and 206 as well as motors 134 and 150 are connected by conduits to a hydraulic fluid cooler 236, such connection being represented by dashed lines 238, 240, 242 and 244. Line 244 leads to a return line 246 which, in turn, is directed into cooler 236, the output of which at line 248 leads to a hydraulic fluid reservoir represented schematically at 250. The remote supply of hydraulic fluid to pumps 204 and 206 is provided from reservoir 250 via conduit or line 252 which extends therefrom to a filter 254. From filter 254, the supply is provided via line 256 to pump 204 and via line 258 to pump 206.

Hydraulic pump 202 may be present as a variable displacement non-compensating bi-directional variety, the input of which is coupled through line 260 containing filter 262 to reservoir 250. The output of pump 202 is present at line 264 which extends to an infinite position four-way valve symbolically represented at 266. Valve 266 may be manipulated by the operator within cab 208 as schematically represented by the lever 268. Bi-directional lines 270 and 272 extend from valve 266 to hydraulic motor 52 for driving conveyor 30 in either available rotational sense and at predetermined speeds. To carry out appropriate valving, a return line 274 is provided extending to reservoir 250 from valve 266. Additionally, the hydraulic drive input at line 264 is monitored by a line 276 containing an adjustable pressure relief valve 278 which operates in conjunction with a pilot line 280. The output of valve 278 is shown coupled through line 282 to reservoir 250. A constant pressure variable flow approach tooperating motor 52 permits the apparatus 24 to operate in association with loads which necessarily vary in terms of moisture content of the biodegradable material as well as its general makeup. Motor 52 may, for example, be provided as a 90 G.P.M. type 60PO92DCAS marketed by Cross Mfg., Inc., Lewis, Ka.; while valve 266 may be provided as a type QF-06H-0-10AZ-DC-12 marketed by Double A Products Co., Manchester, Mich.; and Valve 278 may be provided as a type B-10-10A3 marketed by Double A Products Co.(supra).

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Self-propelled windrowing apparatus for laterally transferring an elongate row of biodegradable material, said row being oriented along a given, centrally disposed axis and having a given width, comprising:

a windrow conveyor having spaced, parallel, mutually interconnected elongate paddles drivably, orbitally movable about spaced parallel axes and having a downwardly disposed region for confronting said row of material and progressively moving said material to an adjacent said row thereof;

a rigid frame;

first motor means mounted upon said rigid frame;

mounting means for mounting said conveyor at a forwardly disposed portion of said frame such that said paddles within said downwardly disposed region are arranged at an acute angle with respect to said centrally disposed axis when said conveyor is urged into confrontation with said row;

first and second spaced apart wheel means connected with said frame for supporting and driving said frame and having respective fixed axes of rotation aligned to normally drive said apparatus along a vector parallel with said centrally disposed axis to urge said conveyor into said confrontation, said first and second wheel means being disposed at opposite sides of said frame, said first wheel means being disposed at a first said side and rearwardly of said conveyor downwardly disposed region, said second wheel means being disposed at a second said side and substantially outwardly of said downwardly disposed region;

second and third motor means selectively powered from said first motor means and respectively coupled in driving relationship with said first and second wheel means;

third freely rotatable wheel means freely pivotal about a vertical axis, attached to said frame at said second side in the vicinity of the forward portion of said downwardly disposed region for supporting the forward portion of said frame for movement; and control means actuable to effect said select powering of said second and third motor means.

2. The windrowing apparatus of claim 1 in which said first motor means is mounted intermediate said first and second sides.

3. The windrowing apparatus of claim 1 including fourth motor means powered from said first motor means for driving said conveyor paddles.

4. The windrowing apparatus of claim 1 in which:

said first motor means comprises hydraulic pump means and an internal combustion engine having an output coupled thereto for providing a constant pressure hydraulic output;

said second and third motor means are provided as hydraulic motors coupled in hydraulic drive communication with said first motor means hydraulic output; and said control means is actuable to selectively vary the rate of flow of hydraulic fluid to said second and third motor means for carrying out steering of said apparatus.

5. The windrowing apparatus of claim 4 in which said first motor means is mounted intermediate said first and second sides.

6. The windrowing apparatus of claim 5 wherein said third wheel means is located substantially in alignment with an edge of said row of material when said conveyor is urged into said confrontation with said row.

7. The windrowing apparatus of claim 6 wherein said third wheel means is configured for carrying out the adjustment of the level of said frame forward position so as to provide for the adjustment of the level of said windrow conveyor.

8. The windrowing apparatus of claim 5 wherein said third wheel means is located substantially in alignment with an edge of said row of material when said conveyor is urged into said confrontation with said row; and further is configured for carrying out the adjustment of the level of said frame forward position so as to provide for the adjustment of the level of said windrow conveyor.

9. The windrowing apparatus of claim 5 in which said first and second wheel means are rotatable substantially about a common axis.

10. The windrowing apparatus of claim 1 wherein:

said apparatus includes plow means coupled to said frame forwardly disposed portion adjacent to and outwardly disposed from said windrow conveyor; and said second wheel means is positioned behind said plow means so as to be shielded thereby from said biodegradable material.

11. The windrowing apparatus of claim 10 in which said third wheel means is mounted upon said rigid frame at a location substantially in alignment with an edge of said row of material when said conveyor is urged into said confrontation with said row.

12. The windrowing apparatus of claim 11 including fourth motor means powered from said first motor means for driving said conveyor paddles.

13. The windrowing apparatus of claim 1 including coupling means rearwardly disposed upon said frame for connecting said frame with the foreward portion of a drive vehicle, said vehicle serving as a standby power source serving to push said apparatus in a foreward direction having a principal horizontal vector substantially parallel with said given, centrally disposed axis.

* * * * *